(12) United States Patent
Toyota

(10) Patent No.: US 10,294,995 B2
(45) Date of Patent: May 21, 2019

(54) OIL SEAL STRUCTURE AND TURBOCHARGER

(71) Applicant: IHI Corporation, Koto-ku (JP)

(72) Inventor: Takahisa Toyota, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/869,195

(22) Filed: Jan. 12, 2018

(65) Prior Publication Data

US 2018/0135698 A1 May 17, 2018

Related U.S. Application Data

(63) Continuation of application No. PCT/JP2016/070885, filed on Jul. 14, 2016.

(30) Foreign Application Priority Data

Jul. 22, 2015 (JP) ................. 2015-144744

(51) Int. Cl.
*F16C 33/66* (2006.01)
*F16C 33/78* (2006.01)
(Continued)

(52) U.S. Cl.
CPC .......... *F16C 33/7816* (2013.01); *F02B 39/00* (2013.01); *F02B 39/14* (2013.01); *F16C 33/76* (2013.01); *F16C 33/7886* (2013.01); *F16C 33/80* (2013.01); *F16J 15/162* (2013.01); *F16C 2360/24* (2013.01)

(58) Field of Classification Search
CPC ................ F16C 19/184; F16C 33/6655; F16C 33/7816; F16C 33/7886; F16C 2360/24
See application file for complete search history.

(56) References Cited

U.S. PATENT DOCUMENTS 6,220,829 B1 * 4/2001 Thompson ............ F01D 25/164
417/407
2013/0142679 A1 6/2013 Hornbach et al.

FOREIGN PATENT DOCUMENTS

JP 57-87122 U 5/1982
JP 60-43137 U 3/1985
(Continued)

OTHER PUBLICATIONS

Japanese Notice of Reasons for Refusal dated Jul. 24, 2018 in Patent Application No. 2017-529861, 5 pages (with English language translation).
(Continued)

*Primary Examiner* — Phillip A Johnson
(74) *Attorney, Agent, or Firm* — Oblon, McClelland, Maier & Neustadt, L.L.P.

(57) ABSTRACT

An oil seal structure includes a bearing unit for a shaft, housed in a housing hole formed in a housing, and an opposing member that faces the bearing unit in an axial direction of the shaft and has a body part including an opposing face provided with an insertion hole through which the shaft is inserted. The opposing member includes an oil groove that is formed in the opposing face, is recessed in a direction separating from the bearing unit, and at least partially faces the bearing unit, and a portion at which the insertion hole opens in the opposing face projects toward the bearing unit side from a deepest portion in the oil groove.

17 Claims, 3 Drawing Sheets

(51) Int. Cl.
*F02B 39/00* (2006.01)
*F16C 33/76* (2006.01)
*F16C 33/80* (2006.01)
*F16J 15/16* (2006.01)
*F02B 39/14* (2006.01)

(56) References Cited

FOREIGN PATENT DOCUMENTS

| JP | 63-186934 U | 11/1988 |
|----|-------------|---------|
| JP | 5-65829 | 3/1993 |
| JP | 2000-213541 | 8/2000 |
| JP | 2012-36855 | 2/2012 |
| JP | 2013-536369 A | 9/2013 |
| JP | 2014-51897 | 3/2014 |
| JP | 2015-48755 | 3/2015 |

OTHER PUBLICATIONS

International Search Report dated Sep. 20, 2016 in PCT/JP2016/070885, filed on Jul. 14, 2016.

\* cited by examiner

OIL SEAL STRUCTURE AND TURBOCHARGER

CROSS REFERENCE TO RELATED APPLICATIONS

This application is a continuation application of International Application No. PCT/JP2016/070885, filed on Jul. 14, 2016, which claims priority to Japanese Patent Application No. 2015-144744, filed on Jul. 22, 2015, the entire contents of which are incorporated by reference herein.

BACKGROUND

1. Technical Field

The present disclosure relates to an oil seal structure that suppresses leakage of lubricant applied to a bearing unit, and to a turbocharger.

2. Description of the Related Art

Conventionally, there has been known a turbocharger in which a shaft provided with a turbine wheel at one end and a compressor wheel at the other end is rotatably supported in a bearing housing. The turbocharger as described above is connected to an engine, so that the turbine wheel is rotated by exhaust gas discharged from the engine to cause the compressor wheel to rotate with rotation of the turbine wheel through the shaft. In this way, the turbocharger compresses air with rotation of the compressor wheel, and delivers the air to the engine.

Japanese Patent Laid-Open Publication No. 2012-36855 (Patent Literature 1) describes a configuration in which a rolling bearing is arranged in a housing hole formed in a bearing housing. Between the housing hole and a compressor wheel, an oil seal unit is provided. The oil seal unit is formed with a through-hole through which a shaft is inserted. A seal ring is provided in an inner surface of the through-hole. Further, the oil seal unit has an opposing face facing the housing hole. The opposing face is recessed toward a compressor wheel side to form a space for receiving lubricant flowing out through the housing hole, and the lubricant is guided to an oil drain port formed vertically below the opposing face. The oil drain discharges lubricant from the inside to the outside of the bearing housing.

SUMMARY

As described above, most of lubricant flowing out through the housing hole is discharged from a space between the housing hole and the oil seal unit through the oil drain port. However, some of the lubricant leaks to the compressor wheel side through the through hole of the oil seal unit. While leakage of lubricant can be suppressed by providing a seal ring, development of a technique for further improving sealability is strongly desired.

It is an object of the present disclosure to provide an oil seal structure capable of improving sealability and a turbocharger.

A first aspect of the present disclosure is an oil seal structure that includes a bearing unit for a shaft, housed in a housing hole formed in a housing; and an opposing member that faces the bearing unit in an axial direction of the shaft and has a body part including an opposing face provided with an insertion hole through which the shaft is inserted, wherein the opposing member includes an oil groove that is formed in the opposing face, is recessed in a direction separating from the bearing unit, and at least partially faces the bearing unit, and a portion at which the insertion hole opens in the opposing face projects toward the bearing unit side from a deepest portion in the oil groove.

The oil groove may be continuously formed to an outside in a radial direction of the shaft from the insertion hole.

A portion continuing to the insertion hole in a wall portion where the oil groove is formed may include a tapered portion that inclines in a direction separating from the bearing unit toward the outside in the radial direction.

The tapered portion may extend toward the outside in the radial direction from an innermost diameter portion that continues to the insertion hole and is positioned most inside in the radial direction of the shaft.

The oil seal structure may further may further include: a scroll passage in an annular shape that is formed inside the body part, extends to the outside in the radial direction of the shaft from the insertion hole, and communicates with the insertion hole; an inclined surface that surrounds the scroll passage from the outside in the radial direction of the shaft, and inclines in a direction separating from the bearing unit toward an inside in the radial direction of the shaft; and an annular returning portion that is formed continuously to the inside in the radial direction of the shaft from the inclined surface, projects toward the bearing unit side inside the body part, and has the insertion hole formed on an inner peripheral side.

The opposing member may be a seal plate that suppresses leakage of lubricant from the housing hole toward a wheel side provided on the shaft.

A second aspect of the present disclosure is a turbocharger that includes the oil seal structure according to the first aspect.

According to the present disclosure, sealability can be improved.

DESCRIPTION OF THE EMBODIMENTS

Figure 1:
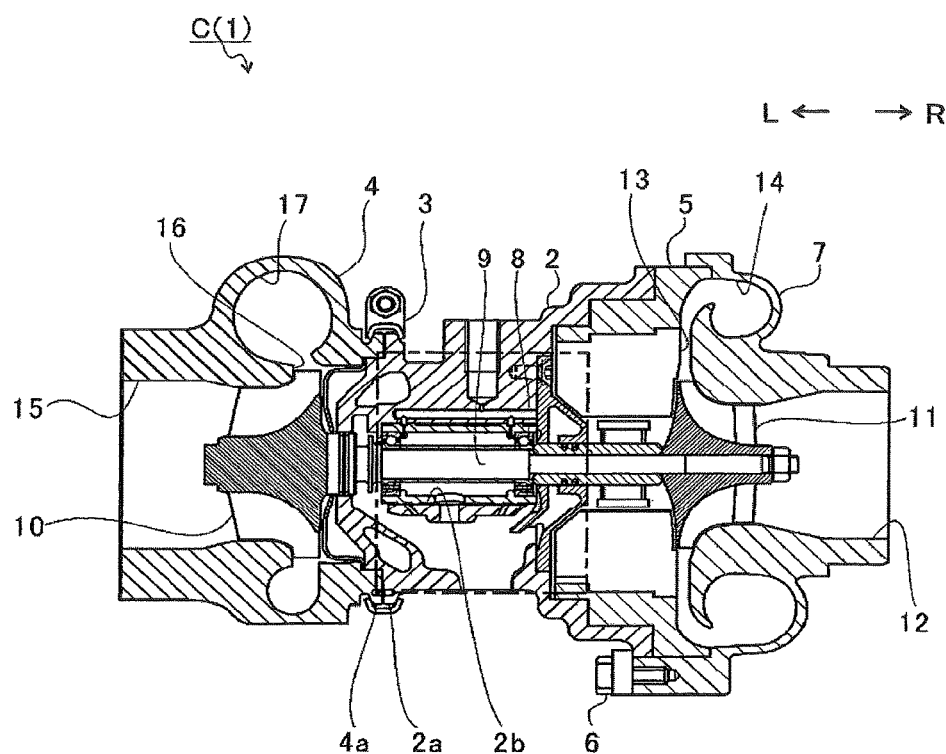
FIG. 1 is a schematic sectional view of a turbocharger.

With reference to accompanying drawings below, an embodiment of the present disclosure will be described in detail. Dimensions, material, other specific numeric values, and the like, shown in the embodiment are merely exemplification to facilitate understanding of the present disclosure, and thus do not limit the present disclosure. Note that, in the present description and the drawings, an element having a substantially identical function and structure is assigned the same reference character to eliminate a duplicated description.

FIG. 1 is a schematic sectional view of a turbocharger C. In the description below, a direction indicated by an arrow L illustrated in FIG. 1 is the left of the turbocharger C, and a direction indicated by an arrow R is the right of the turbocharger C. As illustrated in FIG. 1, the turbocharger C includes a turbocharger body 1. The turbocharger body 1 includes a bearing housing 2 (housing), a turbine housing 4 that is coupled to the left of the bearing housing 2 with a fastening mechanism 3, and a compressor housing 7 that is coupled to the right of the bearing housing 2 with a fastening bolt 6. These housings are integrated. Note that the turbocharger C includes an electric motor 5 provided between the bearing housing 2 and the compressor housing 7. The electric motor 5 includes components, such as a motor rotor, stator coil, and a housing, for example. FIG. 1 illustrates an internal structure of the electric motor 5 by simplifying the structure.

The bearing housing 2 has an outer peripheral surface near the turbine housing 4. The outer peripheral surface is provided with a protrusion 2a. The protrusion 2a protrudes in a radial direction of the bearing housing 2. The turbine housing 4 has an outer peripheral surface near the bearing housing 2. The outer peripheral surface is provided with a protrusion 4a. The protrusion 4a protrudes in a radial direction of the turbine housing 4. The bearing housing 2 and the turbine housing 4 are fixed to each other by fastening of the protrusions 2a and 4a with the fastening mechanism 3. For example, the fastening mechanism 3 is constituted by a G coupling that holds the protrusions 2a and 4a.

A housing hole 2b is formed in the bearing housing 2. The housing hole 2b penetrates the bearing housing 2 in a left-right direction of the turbocharger C. In the housing hole 2b, a rolling bearing (bearing unit) 8 is provided. The rolling bearing 8 rotatably supports a shaft 9. The shaft 9 has the left end fixed to a turbine wheel 10. The turbine wheel 10 is rotatably housed in the turbine housing 4. Further, the shaft 9 has the right end fixed to a compressor wheel 11. The compressor wheel 11 is rotatably housed in the compressor housing 7.

An intake port 12 is formed in the compressor housing 7. The intake port 12 opens on the right of the turbocharger C to be connected to an air cleaner (not illustrated). Further, in a state where the electric motor 5 and the compressor housing 7 are coupled to each other with the fastening bolt 6, mutually opposing faces of the electric motor 5 and the compressor housing 7 form a diffuser passage 13 which increases air pressure. The diffuser passage 13 is annularly formed from inward to outward in the radial direction of the shaft 9. Furthermore, the diffuser passage 13 communicates with the intake port 12 through the compressor wheel 11 inside in the radial direction.

The compressor housing 7 is provided with a compressor scroll passage 14. The compressor scroll passage 14 is annularly formed, and is positioned outside in the radial direction of the shaft 9 from the diffuser passage 13. The compressor scroll passage 14 communicates with not only an intake port (not illustrated) of an engine, but also the diffuser passage 13. Thus, when the compressor wheel 11 rotates, air is suctioned into the compressor housing 7 through the intake port 12. The suctioned air is accelerated by action of centrifugal force in a process of circulating among vanes of the compressor wheel 11, and is raised in pressure by the diffuser passage 13 and the compressor scroll passage 14 to be guided into the intake port of the engine.

A discharge port 15 is formed in the turbine housing 4. The discharge port 15 opens on the left of the turbocharger C, and is connected to an exhaust gas purification device (not illustrated). Further, the turbine housing 4 includes a passage 16, and an annular turbine scroll passage 17 that is positioned outside in the radial direction of the turbine wheel 10 from the passage 16. The turbine scroll passage 17 communicates with not only a gas inflow port (not illustrated) through which exhaust gas from an exhaust manifold (not illustrated) of the engine is guided, but also the passage 16. Thus, the exhaust gas is guided into the turbine scroll passage 17 through the gas inflow port (not illustrated), and then is guided into the discharge port 15 through the passage 16 and the turbine wheel 10. The exhaust gas rotates the turbine wheel 10 in this circulation process.

Rotating force of the turbine wheel 10 is transmitted to the compressor wheel 11 through the shaft 9. The rotating force of the compressor wheel 11 increases air pressure as described above, and guides the air into the intake port of the engine. Note that the electric motor 5 secondarily rotates the shaft 9 when the rotating force of the turbine wheel 10 is insufficient, and generates power along with rotation of the shaft 9 when the rotating force by the turbine wheel 10 is sufficiently supplied.

Figure 2:
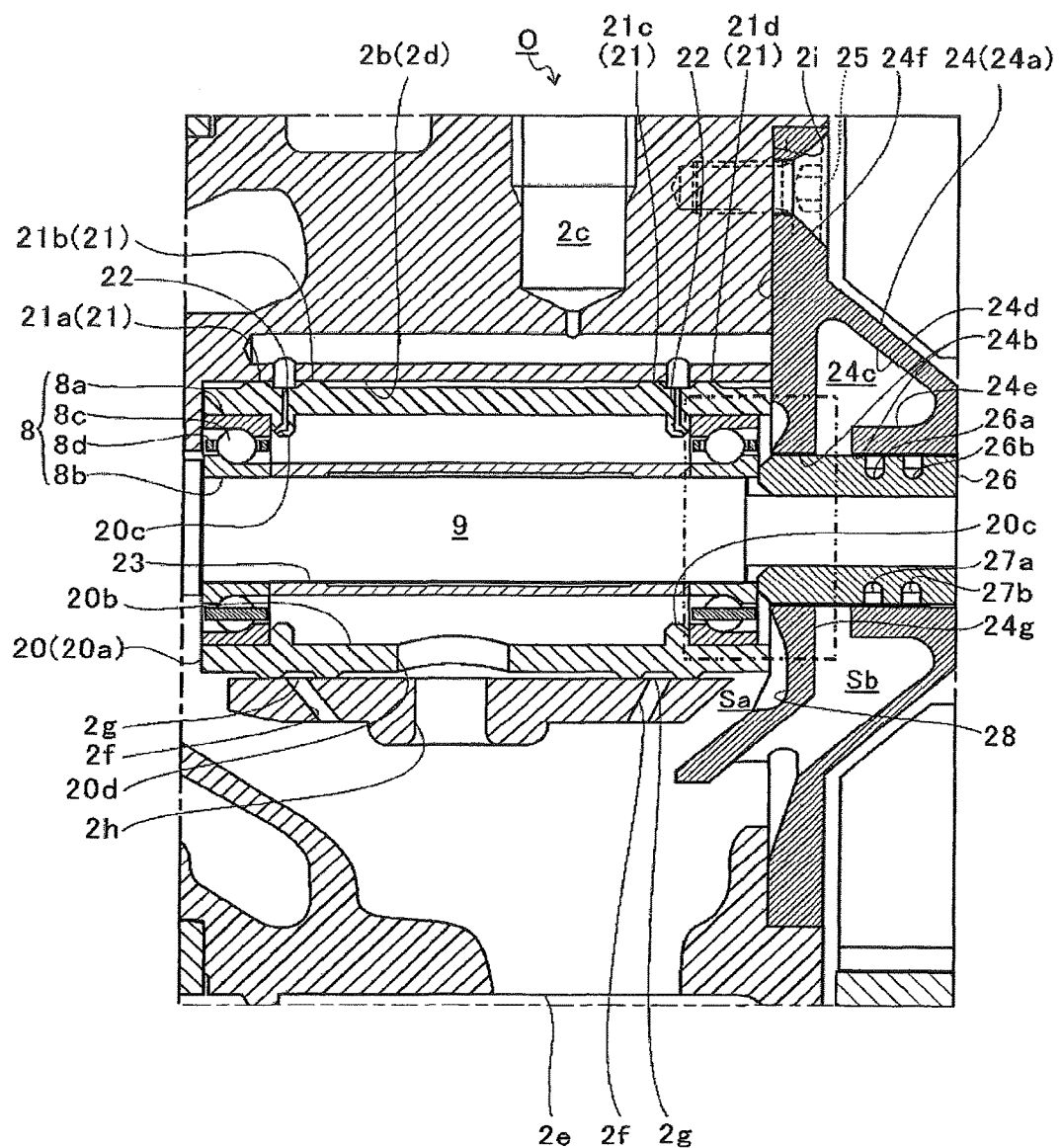
FIG. 2 is an illustration of an extracted portion surrounded by a dashed line in FIG. 1.

FIG. 2 is an illustration of an extracted portion surrounded by a dashed line in FIG. 1. As illustrated in FIG. 2, the turbocharger C includes an oil seal structure O. The bearing housing 2 is provided with a supply channel 2c. The supply channel 2c supplies lubricant into the housing hole 2b from the outside of the bearing housing 2. In the housing hole 2b, a vibration absorbing member 20 is housed. The vibration absorbing member 20 includes a cylindrical member body 20a. At least one damper 21 is formed on an outer peripheral surface of the member body 20a. The damper 21 is positioned outside the rolling bearing 8 in the radial direction of the shaft 9, and holds lubricant between an inner wall 2d of the housing hole 2b and the damper 21 to absorb vibration of the shaft 9.

Further, the damper 21 includes annular protrusions 21a to 21d that protrude toward outside in the radial direction of the member body 20a. A total of the four annular protrusions 21a to 21d are provided two by two on each of both end sides of the member body 20a in the axial direction of the shaft 9 (hereinafter referred to simply as the axial direction).

Furthermore, in FIG. 2, the upper side roughly corresponds to a vertically upper side, and the lower side roughly corresponds to a vertically lower side. An oil drain port 2e is formed at a portion positioned vertically below the housing hole 2b in the bearing housing 2. The oil drain port 2e discharges lubricant from the inside of the bearing housing 2 to the outside of the bearing housing 2.

An oil drain hole 2f is provided in the bearing housing 2. The oil drain hole 2f penetrates from the oil drain port 2e side to the housing hole 2b. The oil drain hole 2f discharges lubricant from the housing hole 2b to guide it into the oil drain port 2e. In the present embodiment, the oil drain hole 2f is formed on each of both end sides of the housing hole 2b. An opening 2g of the oil drain hole 2f is positioned on the housing hole 2b side, and faces the damper 21.

One of the two oil drain holes 2f is positioned between the annular protrusions 21a and 21b. The other of the two oil drain holes 2f is positioned between the annular protrusions 21c and 21d. Each of the two oil drain holes 2f extends from the opening 2g toward the oil drain port 2e.

The supply channel 2c branches in the bearing housing 2. One of the branching supply channels 2c opens between the annular protrusion 21a and the annular protrusion 21b in the inner wall 2d of the housing hole 2b. The other of the branching supply channels 2c opens between the annular protrusion 21c and the annular protrusion 21d in the inner wall 2d. The body 20a includes two oil guide passages 22 formed in its inside. One of the oil guide passages 22 opens between the annular protrusion 21a and the annular protrusion 21b in the outer peripheral surface of the member body 20a. The other of the oil guide passages 22 opens between the annular protrusion 21c and the annular protrusion 21d in the outer peripheral surface of the member body 20a. Any one of the oil guide passages 22 communicates with a space in the body 20a to guide lubricant into the rolling bearing 8 housed in the body 20a.

The rolling bearing 8 is housed one by one on each of both end sides in the axial direction of the shaft 9 inside the member body 20a. The two rolling bearings 8 are arranged axially separate from each other. Each of the rolling bearings 8 includes an outer ring 8a, and an inner ring 8b smaller than the outer ring 8a in diameter. In addition, each of the rolling bearings 8 includes a plurality of balls 8c that is provided between the outer ring 8a and the inner ring 8b, and is aligned in the circumferential direction of the outer ring 8a (inner ring 8b). The plurality of balls 8c is held by a cage 8d.

The outer ring 8a is held by the vibration absorbing member 20, and the inner ring 8b rotates integrally with the shaft 9. At this time, the balls 8c roll and thereby reduce frictional resistance with the outer ring 8a and the inner ring 8b, thus enabling relative rotation of the outer ring 8a and the inner ring 8b. In this way, the rolling bearing 8 receives a radial load of the shaft 9.

A restriction part 23 is provided between the two inner rings 8b inside the vibration absorbing member 20. The restriction part 23 is a cylindrical (annular) member. The shaft 9 is inserted into the restriction part 23. In addition, both ends of the restriction part 23 in the axial direction of the shaft 9 contact with the respective inner rings 8b. The restriction part 23 restricts the two inner rings 8b from approaching each other while rotating integrally with the inner rings 8b.

Two guide portions 20c are formed on an inner peripheral surface 20b of the vibration absorbing member 20. Each of the guide portions 20c is annularly formed, and protrudes inward in the radial direction of the vibration absorbing member 20. The two rolling bearings 8 are fitted into the member body 20a from the respective both end sides of the member body 20a until coming into contact with the respective guide portions 20c. Further, each of the oil guide passages 22 extends through the corresponding guide portion 20d to open toward the rolling bearing 8.

A discharge hole 20d is provided between the two guide portions 20c in the member body 20a. A part of lubricant is fed to the rolling bearing 8 through the oil guide passage 22, hits against the ball 8c and the like and is bounced off to be discharged from the inside of the member body 20a into the housing hole 2b through the discharge hole 20d. An opposing hole 2h is formed in the bearing housing 2. The opposing hole 2h is formed at a position facing the discharge hole 20d. The opposing hole 2h penetrates from the housing hole 2b to the oil drain port 2e side, and guides lubricant in the housing hole 2b into the oil drain port 2e.

On the right (on a side of the electric motor 5 and the compressor wheel 11) in FIG. 2, a seal plate (opposing member) 24 is provided with respect to the housing hole 2b. A recessed portion 2i is formed in the bearing housing 2 on the compressor wheel 11 side of the housing hole 2b. The recessed portion 2i is recessed left in FIG. 2. The seal plate 24 is attached to the recessed portion 2i with a fastening member 25.

The seal plate 24 includes a body part 24a provided with an insertion hole 24b penetrating in the axial direction of the shaft 9. An annular seal scroll passage 24c (scroll passage) is formed inside the body part 24a. A space on the rolling bearing 8 side in the seal scroll passage 24c extends inward in the radial direction of the shaft 9 to communicate with the insertion hole 24b. A right wall surface in FIG. 2 in the seal scroll passage 24c forms an inclined surface 24d. The inclined surface 24d surrounds the seal scroll passage 24c from radially outside. In addition, the inclined surface 24d is inclined right toward the inside in the radial direction (toward the compressor wheel 11 side).

A returning portion 24e is formed continuously to an inside in the radial direction of the shaft 9 from the inclined surface 24d. The returning portion 24e is formed in the shape of a ring projecting inside the body part 24a from the inclined surface 24d toward the rolling bearing S side. The returning portion 24e and the inclined surface 24d face each other in the radial direction of the shaft 9. An inner peripheral surface of the returning portion 24e forms the insertion hole 24b described above. The seal scroll passage 24c and the insertion hole 24b communicate with each other at a position closer to the rolling bearing 8 side than the returning portion 24e.

As illustrated in FIG. 2, a lower side of the seal scroll passage 24c opens toward the oil drain port 2e. In this way, the inclined surface 24d reduces the seal scroll passage 24c in volume toward the right in FIG. 2. In other words, the inclined surface 24d allows the seal scroll passage 24c to project toward the compressor wheel 11. This secures a large volume of the seal scroll passage 24c.

Some of lubricant flowing out from the insertion hole 24b into the seal scroll passage 24c and scattering onto the inclined surface 24d vertically above the returning portion 24e, flows radially inward along the inclined surface 24d. The lubricant then flows along an outer peripheral surface of the returning portion 24e. Thus, the lubricant can be guided into the oil drain port 2e while bypassing the insertion hole 24b, so that sealability can be improved.

Further, the shaft 9 is inserted into the insertion hole 24b of the seal plate 24. Between the shaft 9 and the insertion hole 24b, an interposing part 26 is arranged. The interposing part 26 is formed in a cylindrical (annular) shape, is fixed to the shaft 9, and rotates integrally with the shaft 9. The interposing part 26 is formed with two annular grooves 26a and 26b. The annular grooves 26a and 26b are positioned radially inside the returning portion 24e.

Two seal rings 27a and 27b are pressed into positions facing the annular grooves 26a and 26b in an inner peripheral surface of the insertion hole 24b. An outer peripheral surface of each of the seal rings 27a and 27b is in contact with the inner peripheral surface of the insertion hole 24b, and a part of a radially inward portion of each of the seal rings 27a and 27b is inserted into the corresponding one of the annular grooves 26a and 26b.

The body part 24a includes an opposing face 24f facing the rolling bearing 8 (housing hole 2b) in the axial direction of the shaft 9. At the opposing face 24f, the insertion hole 24b of the shaft 9 opens. Further, the opposing face 24f is provided with an oil groove 28. The oil groove 28 is recessed in a direction separating from the rolling bearing 8 in the axial direction of the shaft 9. In addition, the oil groove 28 faces the rolling bearing 8, and a part of the oil groove 28 continuously extends outside in the radial direction of the shaft 9.

A portion positioned closer to the rolling bearing 8 side than the seal scroll passage 24c in the body part 24a serves as a partition wall 24g that divides, into two spaces, an oil drain space for draining lubricant flowing out to the seal plate 24 side. In the present embodiment, one of the spaces divided by the partition wall 24g, on the rolling bearing 8 side, is referred to as a first oil drain space Sa, and the other of the spaces on the compressor wheel 11 side (i.e., the seal scroll passage 24c) is referred to as a second oil drain space Sb.

Some of lubricant circulates through the damper 21 and the rolling bearing 8, and then flows out from axial both ends of the housing hole 2b. Lubricant flowing into the compressor wheel 11 side first flows out into the oil groove 28 (first oil drain space Sa). As illustrated in FIG. 2, an upper side of the first oil drain space Sa is closed by an inner wall forming the first oil drain space Sa. Meanwhile, a lower side of the first oil drain space Sa is opened. Thus, the lubricant guided into the first oil drain space Sa is discharged from the lower side of the first oil drain space Sa.

In addition, some of lubricant in the first oil drain space Sa flows out into the second oil drain space Sb through a clearance between the insertion hole 24b and the interposing part 26 in the radial direction. In the second oil drain space Sb, the lubricant turns together with the interposing part 26 to be scattered by centrifugal force, and then flows downward in FIG. 2 along an inner wall of the seal scroll passage 24c in its circumferential direction.

Some of the lubricant flows radially outward by the centrifugal force when being scattered, and flows downward along the inclined surface 24d when colliding with a portion of the inclined surface 24d, positioned below the shaft 9 in the vertical direction. In addition, when some of the lubricant collides with a portion of the inclined surface 24d, positioned above the shaft 9 in the vertical direction, the some of the lubricant flows downward along an outer periphery of the returning portion 24e. In this way, provision of the inclined surface 24d and the returning portion 24e suppresses entry of lubricant to the seal rings 27a and 27b side.

As with the first oil drain space Sa, an upper side of the second oil drain space Sb is closed by an inner wall forming the second oil drain space Sb. Meanwhile, a lower side of the second oil drain space Sb is opened. Thus, the lubricant guided into the second oil drain space Sb is discharged from the lower side of the second oil drain space Sb. Then, the oil drain port 2e guides the lubricant guided downward from the first oil drain space Sa and the second oil drain space Sb to the outside of the bearing housing 2.

In this way, the seal plate 24 suppresses leakage of lubricant from the housing hole 2b to the compressor wheel 11. However, when a large amount of lubricant flows out from the first oil drain space Sa to the second oil drain space Sb, the lubricant may enter the seal rings 27a and 27b side beyond a limit of oil-drain capacity of the second oil drain space Sb. Thus, the oil seal structure O is provided with a structure for suppressing outflow of lubricant into the second oil drain space Sb from the first oil drain space Sa.

Figure 3:
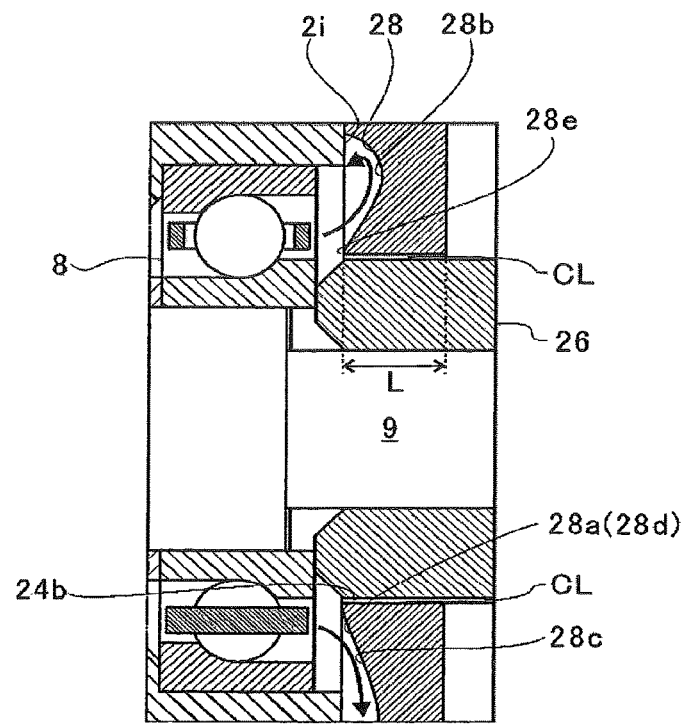
FIG. 3 is an illustration of an extracted portion surrounded by a two-dot chain line in FIG. 2.

FIG. 3 is an illustration of an extracted portion surrounded by a two-dot chain line in FIG. 2. As illustrated in FIG. 3, a projecting portion 28a is provided radially inside the oil groove 28. The projecting portion 28a is formed in a portion in the opposing face 24f, where the insertion hole 24b opens. Then, the projecting portion 28a projects toward the rolling bearing 8 side from a deepest portion 28b where the oil groove 28 becomes deep toward the right in FIG. 3 (on a side axially separating from the rolling bearing 8). The projecting portion 28a here substantially coincides with a bottom face of the recessed portion 2i of the bearing housing 2 at an axial position.

In addition, a tapered portion 28d is formed at a portion continuing to the insertion hole 24b (i.e., the projecting portion 28a) in a wall portion 28c where the oil groove 28 is formed. The tapered portion 28d inclines in a direction separating from the rolling bearing 8 toward radially outside. The tapered portion 28d extends toward radially outside from an innermost diameter portion 28e that continues to the insertion hole 24b and is positioned at a radially most inward portion.

When the projecting portion 28a is provided in the oil groove 28, lubricant flowing out into the oil groove 28 is guided into the deepest portion 28b in the oil groove 28 from the projecting portion 28a. This enables reduction in the amount of lubricant flowing to a clearance CL between the insertion hole 24b and the interposing part 26. In addition, when the projecting portion 28a is provided, it is possible to secure a long axial length L of a portion where the insertion hole 24b and the interposing part 26 radially face each other. As a result, frictional resistance until lubricant passes through the clearance CL is increased (i.e., pressure loss is increased), so that pressure difference between the first oil drain space Sa and the second oil drain space Sb enables reduction in the amount of lubricant flowing through the clearance CL. Thus, leakage of lubricant into the second oil drain space Sb through the clearance CL can be reduced.

Figure 4:
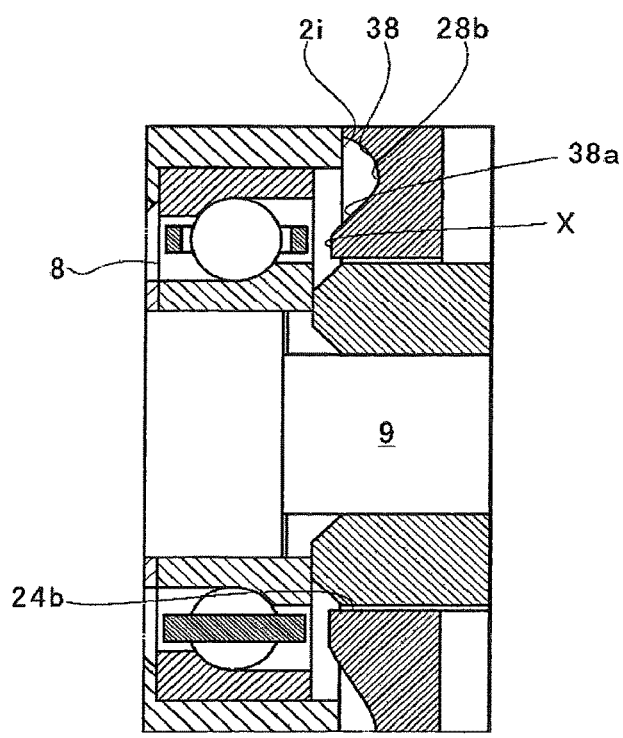
FIG. 4 is an illustration to illustrate a modification.

In the present embodiment, the oil groove 28 is formed continuously to outside in the radial direction of the shaft 9 from the insertion hole 24b. However, the oil groove 28 may not continue to outside in the radial direction of the shaft 9 from the insertion hole 24b. That is, an oil groove 38 is formed separating radially outward from the insertion hole 24b, like a modification illustrated in FIG. 4, and a portion X radially inside a projecting portion 38a may project toward the rolling bearing 8 side from the projecting portion 38a. However, when the oil groove 28 is formed continuing to outside in the radial direction of the shaft 9 from the insertion hole 24b, lubricant flowing toward the insertion hole 24b can be easily guided along the oil groove 28, thereby enabling improvement in sealability.

In the present embodiment, the tapered portion 28d is provided. However, the tapered portion 28d may be eliminated. However, when the tapered portion 28d is provided, an axial flow of lubricant flowing out from the rolling bearing 8 can be oriented toward radially outside along the tapered portion 28d, thereby enabling further improvement in sealability.

In the present embodiment, the tapered portion 28d extends toward radially outside from the innermost diameter portion 28e. However, the tapered portion 28d may extend from a starting point being a position radially outside and separating from the innermost diameter portion 28e. However, when the tapered portion 28d extends toward radially outside from the innermost diameter portion 28e, lubricant even slightly flowing toward radially outside from the insertion hole 24b can be oriented toward radially outside along the tapered portion 28d, thereby enabling further improvement in sealability.

In the present embodiment, the seal plate 24 is the opposing member. However, the opposing member is not limited to the seal plate 24 described above. That is, another member may include the body part 24a that faces the rolling bearing 8 in the axial direction of the shaft 9, and that has an opposing face at which the insertion hole 24b through which the shaft 9 is inserted opens.

In the present embodiment, the rolling bearing 8 is provided as a bearing unit. However, the bearing unit may be another bearing that rotatably supports the shaft 9.

In the present embodiment, the turbocharger C includes the electric motor 5. However, the electric motor 5 may be eliminated depending on specifications of a turbocharger. However, when the electric motor 5 is provided, the turbocharger C tends to increase in size in the axial direction of the shaft 9 by a size of the electric motor 5. Even if a space to secure the first oil drain space Sa and the second oil drain space Sb is limited to prevent further increase in size, sealability can be improved as described above.

In the present embodiment, the oil seal structure O is arranged on the compressor wheel 11 side of the housing hole 2b in the turbocharger C. However, the oil seal structure O may be arranged on a turbine wheel 10 side of the housing hole 2b. In addition, a device provided with the oil seal structure O is not limited to the turbocharger C, and may be another rotary machine including a bearing unit.

The present disclosure is not limited to the embodiment described above. A person skilled in the art can conceive various variations or modifications in the category described in the scope of claims. They naturally fall within the technical scope of the present disclosure.

What is claimed is:

1. An oil seal structure comprising:
    a bearing unit for a shaft, housed in a housing hole formed in a housing; and
    an opposing member that faces the bearing unit in an axial direction of the shaft and has a body part including an opposing face provided with an insertion hole through which the shaft is inserted, wherein
    the opposing member includes an oil groove that is formed in the opposing face, is recessed in a direction separating from the bearing unit, and at least partially faces the bearing unit, and
    a portion at which the insertion hole opens in the opposing face projects toward the bearing unit side from a deepest portion in the oil groove.

2. The oil seal structure according to claim 1, wherein the oil groove is continuously formed to an outside in a radial direction of the shaft from the insertion hole.

3. The oil seal structure according to claim 2, wherein a portion continuing to the insertion hole in a wall portion where the oil groove is formed includes a tapered portion that inclines in a direction separating from the bearing unit toward the outside in the radial direction.

4. The oil seal structure according to claim 3, wherein the tapered portion extends toward the outside in the radial direction from an innermost diameter portion that continues to the insertion hole and is positioned most inside in the radial direction of the shaft.

5. The oil seal structure according to claim 4, further comprising:
    a scroll passage in an annular shape that is formed inside the body part, extends to the outside in the radial direction of the shaft from the insertion hole, and communicates with the insertion hole;
    an inclined surface that surrounds the scroll passage from the outside in the radial direction of the shaft, and inclines in a direction separating from the bearing unit toward an inside in the radial direction of the shaft; and
    an annular returning portion that is formed continuously to the inside in the radial direction of the shaft from the inclined surface, projects toward the bearing unit side inside the body part, and has the insertion hole formed on an inner peripheral side.

6. The oil seal structure according to claim 5, wherein the opposing member is a seal plate that suppresses leakage of lubricant from the housing hole toward a wheel side provided on the shaft.

7. The oil seal structure according to claim 4, wherein the opposing member is a seal plate that suppresses leakage of lubricant from the housing hole toward a wheel side provided on the shaft.

8. The oil seal structure according to claim 3, further comprising:
    a scroll passage in an annular shape that is formed inside the body part, extends to the outside in the radial direction of the shaft from the insertion hole, and communicates with the insertion hole;
    an inclined surface that surrounds the scroll passage from the outside in the radial direction of the shaft, and inclines in a direction separating from the bearing unit toward an inside in the radial direction of the shaft; and
    an annular returning portion that is formed continuously to the inside in the radial direction of the shaft from the inclined surface, projects toward the bearing unit side inside the body part, and has the insertion hole formed on an inner peripheral side.

9. The oil seal structure according to claim 8, wherein the opposing member is a seal plate that suppresses leakage of lubricant from the housing hole toward a wheel side provided on the shaft.

10. The oil seal structure according to claim 3, wherein the opposing member is a seal plate that suppresses leakage of lubricant from the housing hole toward a wheel side provided on the shaft.

11. The oil seal structure according to claim 2, further comprising:
    a scroll passage in an annular shape that is formed inside the body part, extends to the outside in the radial direction of the shaft from the insertion hole, and communicates with the insertion hole;
    an inclined surface that surrounds the scroll passage from the outside in the radial direction of the shaft, and inclines in a direction separating from the bearing unit toward an inside in the radial direction of the shaft; and
    an annular returning portion that is formed continuously to the inside in the radial direction of the shaft from the inclined surface, projects toward the bearing unit side inside the body part, and has the insertion hole formed on an inner peripheral side.

12. The oil seal structure according to claim 11, wherein the opposing member is a seal plate that suppresses leakage of lubricant from the housing hole toward a wheel side provided on the shaft.

13. The oil seal structure according to claim 2, wherein the opposing member is a seal plate that suppresses leakage of lubricant from the housing hole toward a wheel side provided on the shaft.

14. The oil seal structure according to claim 1, further comprising:
    a scroll passage in an annular shape that is formed inside the body part, extends to the outside in the radial direction of the shaft from the insertion hole, and communicates with the insertion hole;
    an inclined surface that surrounds the scroll passage from the outside in the radial direction of the shaft, and inclines in a direction separating from the bearing unit toward an inside in the radial direction of the shaft; and
    an annular returning portion that is formed continuously to the inside in the radial direction of the shaft from the inclined surface, projects toward the bearing unit side inside the body part, and has the insertion hole formed on an inner peripheral side.

15. The oil seal structure according to claim 14, wherein the opposing member is a seal plate that suppresses leakage of lubricant from the housing hole toward a wheel side provided on the shaft.

16. The oil seal structure according to claim 1, wherein the opposing member is a seal plate that suppresses leakage of lubricant from the housing hole toward a wheel side provided on the shaft.

17. A turbocharger comprising the oil seal structure according to of claim 1.

* * * * *